(No Model.)
R. M. HUNTER.
ELECTRIC RAILWAY.
No. 448,523. Patented Mar. 17, 1891.
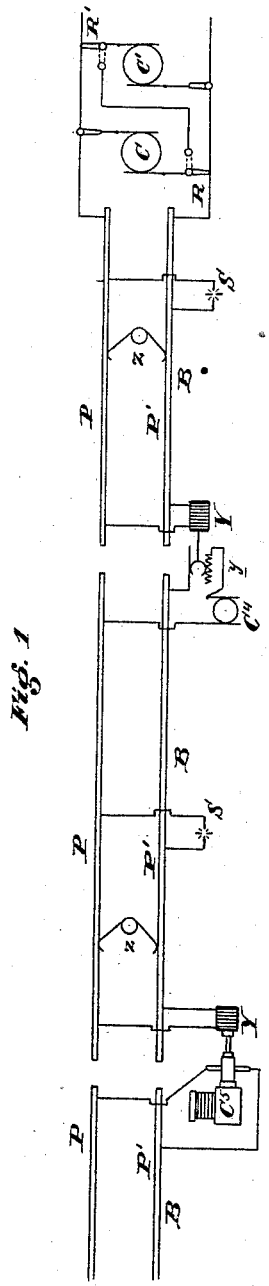
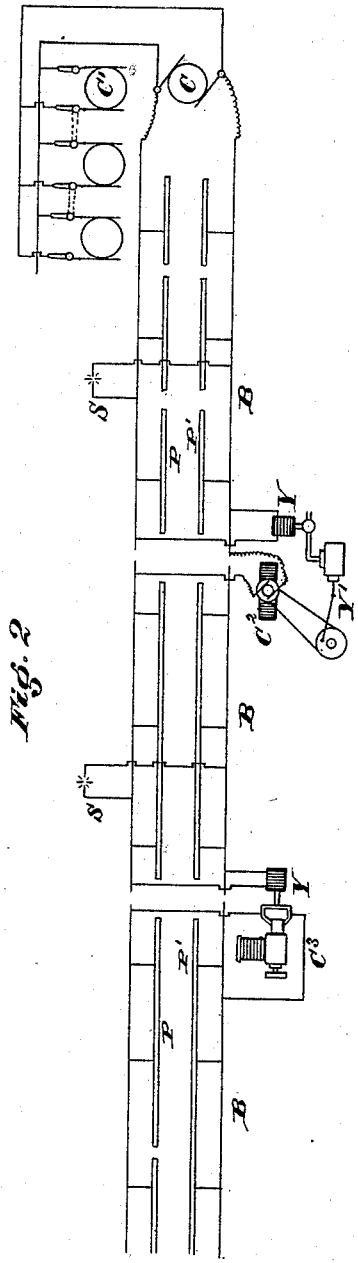

United States Patent Office.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 448,523, dated March 17, 1891.

Original application filed March 18, 1886, Serial No. 195,742. Divided and application filed September 21, 1887, Serial No. 250,273. Again divided and this application filed April 30, 1888. Serial No. 272,260. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railroads; and it consists in certain improvements in the construction, all of which are fully set forth in the following specification, and shown in the accompanying drawings, which form part thereof.

This is a division of my application, Serial No. 250,273, dated September 21, 1887, which was in turn a division of my application, Serial No. 195,742, dated March 18, 1886.

My object is to provide a line-circuit for an electric railway in sections of great length, from which the current may be taken off to the motors either directly or through the mediation of intermediate sectional or continuous-working conductors and furnish each of said sections of line-circuit with its own generator, and, further, providing each section of line-circuit with an electrically-actuated device controlled by the current in its section to control the generation and supply of electricity to the next section, whereby the potential of all of the sections may be controlled from the home station.

My object is also to provide an electric-lighting circuit to light the railway and adjacent parts, receiving electric current from the same generators which supply current to line conductors of the railway, and also using such railway-conductors as the lighting-circuits.

In the drawings, Figure 1 is a diagram illustrating an electric railway made in sections and each having an independent generator, and which generators are all controlled from the home station; and Fig. 2 is a similar view illustrating modifications of the details of construction.

C and C' are two generators to supply electricity to the line and may be coupled up in multiple or series.

R and R' are switches, which when moved change the connection of the generators from multiple to series, or vice versa. These switches R R' might be moved by hand. The multiple connection will usually suffice unless the atmospheric condition is such that it interferes with the contacts in the various parts, motors, circuits, &c. It is often necessary that an increased electro-motive force is required to keep the road in working condition. It is evident that there may be more than two generators with similar coupling devices.

In Fig. 1 we have several sections B of working-conductors P P' controlled from the home station where the generators C C' are located.

In Fig. 2 we have the working-conductors in sections and supplied with electricity from supply-conductors; but so far as my invention is concerned it is immaterial what these arrangements are. In Fig. 1 the current in the first section of railway is made to act by the helix Y to cut in or out resistance $y$ to vary the current delivered by the generator $C^4$ to the next section; or a helix may be used to shift the commutator of the generator $C^5$ for the next section to control its current delivered to the next following section.

In Fig. 2 the end of a long section of line conductors is provided with a controlling helix or magnet Y to control the speed of the steam-engine Y', which drives the dynamo-electric machine $C^2$, which supplies electricity to the next section and so on; or the magnet Y may be used to move the brushes, as shown at $C^3$ (or commutator or throw resistances in or out) to control the current in said distant sections. By this means the current in the various sections of the main lines may be kept relatively uniform with that indicated at the home station.

By making the line conductors separate from the working-conductors they may be thoroughly protected and not having the severe usage of the working-conductors there will be less liability to leakage. When a section of working-conductor needs repairing, it may be removed without disturbing the main or line conductors, or the line conductors may be changed or tapped for auxiliary uses, as for an electric light, (see Figs. 1 and 2,) without interfering with the working-conductors, and these additions or changes may be made while the electric railway is in operation. The line conductors may be bare or insulated rails or wires, and may be hung on poles buried in the ground or placed in the conduit.

It is desirable that the generators be small in size and in numbers sufficient that they may be coupled up in the series or multiple connection to supply the demand. It is evident that part of such generators might be coupled up in series and these as a unity coupled up with other generators. By using small generators the various ways of coupling up the generators enables the requisite tension or volume of current desired to be readily obtainable.

S are electric lights in multiple connection with the line or working conductors of the main line and branch road and receive current from the generators C C' through the electric-railway conductors.

I do not limit myself to the details herein set out, as they may be modified in various ways without departing from my invention.

Having now described my invention, what I claim as new, and desire to secure by Letters Patent, is—

1. In an electric railway, the line conductors arranged in long sections, an electric generator for each section, and controlling devices, substantially as set forth, actuated by the strength of current in one section for controlling the supply of electricity to the next section, whereby the electric supply to all sections may be substantially or relatively the same, to the end that the same motor may run upon all sections, substantially as and for the purpose specified.

2. In an electric railway, the line conductors arranged in long sections, in combination with separate sources of electric supply, and governing devices controlled by the electric-supply generator of the first section to control the electric supply to all of the other sections automatically, substantially as and for the purpose specified.

3. In an electric railway, the line conductors and a traveling electrically-propelled vehicle receiving electricity therefrom, in combination with two or more stationary electric generators at one place in the line to supply electric current to the line conductors, and switches for coupling said generators up in multiple or in series with each other and with the line conductors, and an electric light to light the railway, and a circuit including the electric light and receiving current from the line conductors, substantially as and for the purpose specified.

4. In an electric railway, the combination of two bared working-conductors from which the traveling motors receive the electric current with a number of generators of small size and switches for coupling them up in series and quantity to obtain the requisite quantity and tension of current, substantially as and for the purpose specified.

5. In an electric railway, a series of sections of working-conductors, each receiving electricity from a different source, in combination with means to regulate the supply of electric current to all of said sections simultaneously.

6. In an electric railway, a series of sections of working-conductors, each receiving electricity from a different source, in combination with means to regulate the supply of electric current to all of said sections simultaneously, and means to control the said regulation from one place.

7. In an electric railway, a series of long line or supply conductors and a series of sections of working-conductors to each of said line conductors and receiving electricity therefrom, an independent source of electric energy for each of said line conductors, and an electrical regulator to control the supply of current to each of said line conductors, and means to control all of said regulators from one of said sources of electrical energy.

In testimony of which invention I hereunto set my hand.

RUDOLPH M. HUNTER.

Witnesses:
E. M. BRECKINREED,
ERNEST HOWARD HUNTER.